Patented Aug. 11, 1931

1,818,074

UNITED STATES PATENT OFFICE

ARTHUR LUETTRINGHAUS, OF MANNHEIM, HEINRICH NERESHEIMER, OF LUDWIGSHAFEN-ON-THE-RHINE, AND HANS JOSEF EMMER, OF MANNHEIM, GERMANY, ASSIGNORS TO GENERAL ANILINE WORKS, INC., OF NEW YORK, N. Y., A CORPORATION OF DELAWARE

CONDENSATION PRODUCTS OF THE BENZANTHRONE SERIES

No Drawing. Application filed December 3, 1928, Serial No. 323,561, and in Germany December 8, 1927.

The present invention relates to the production of new condensation products of the benzanthrone series.

We have found that valuable new condensation products of the benzanthrone series are obtained when a mixture of benzanthrone, or a substitution product thereof, with free 2-position, with a compound of the general formula $X-CH_2-R$ in which X stands for a group which due to its unsaturated character activates a hydrogen atom of the $CH_2$ group (see V. Meyer and P. Jacobson, "Lehrbuch der organischen Chemie" II. Edition 1922, Vol. I, Part I, pages 418 and 419), and in which R may be hydrogen or a hydrocarbon radicle, such as an alkyl-, cycloalkyl-, aryl-, or aralkyl- group which may also be substituted, is treated with an alkaline condensing agent. The aforesaid group X may be, for instance, the nitrile group NC—, the acid amide group $NH_2-CO-$, or the acyl group $R'-CO-$, in the latter case the compounds being ketones of the formula $R'-CO-CH_2-R$ in which R' is a hydrocarbon radicle, which may also be substituted. The condensation is carried out in organic diluents, such as for instance benzene, mono-, di- or trichlorobenzene, pyridine and the like, and an excess of the organic compound to be condensed with the benzanthrone may also be employed as the diluent. Furthermore the reaction may be carried out, while air is excluded, for instance in an atmosphere of nitrogen. It may be also carried out in the presence of air, or even in a current of air, if desired. The condensation takes place readily, good yields being obtained.

The condensation products so obtained probably correspond to the following formula:

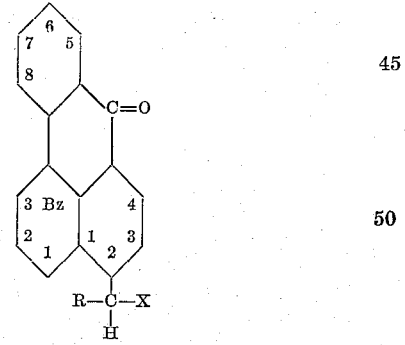

They can be converted by the action of alkaline agents into salt-like compounds which furnish intensely colored solutions with, for example, alcohol or acetone. Dilution of these solutions with water generally effects hydrolysis of the said salt-like compounds.

The new condensation products form valuable initial materials for the production of dyestuffs.

The following examples will further illustrate the nature of the said invention which, however, is not limited thereto. The parts are by weight.

Example 1

200 parts of acetone are dropped, while stirring, into a mixture of 100 parts of benzanthrone, 400 parts of powdered caustic potash, and 3000 parts of benzene, at a temperature of about 20° C., the stirring being continued for about 3 hours at the same temperature. The color of the mixture changes from brownish yellow to greenish yellow and finally to blue green or olive green. The mixture, while being kept at the said temperature by cooling, is then diluted with dilute hydrocholoric acid, whereby it is simultaneously acidified. The benzene layer is freed from water and concentrated, until crystallization takes place. Other alkaline condensing agents, for instance caustic soda or sodium alcoholate, may be employed instead of caustic potash. The condensation may also be carried out while air is excluded, for example, in an atmosphere of nitrogen.

The resulting ketone crystallizes in compact, golden yellow crystals melting at from 189° to 190° C. It dissolves to an intensely blue solution, with reddish tinge, in alcoholic solutions of alkali metal hydroxides and the like and to an orange solution, with yellow brown fluorescence, in concentrated sulfuric acid.

If di-n-propylketone be employed instead of acetone, a condensation product is obtained dissolving in alcoholic caustic alkali to an intensely blue green solution, in concentrated sulfuric acid to a yellow solution with a yellow brown fluorescence.

*Example 2*

200 parts of acetophenone are introduced, while cooling and stirring, into a mixture of 100 parts of benzanthrone, 300 parts of ground caustic potash and 400 parts of anhydrous pyridine, at a temperature of about 20° to 25° C. The initially yellow brown mixture gradually assumes a green and subsequently a bluish green color. The stirring is continued for about 3 hours at the same temperature and, the mixture is, then, diluted with about 1500 parts of alcohol. The blue solution, having a greenish tinge, is then introduced into a mixture of ice and hydrochloric acid in an amount sufficient for acidifying the solution. The reaction product which usually separates out at first as a viscous resinous mass becomes solid on standing. It crystallizes from benzene or glacial acetic acid in the form of handsome pale yellow lamellæ melting at from 205° to 206° C., and furnishes an intensive blue solution having a greenish tinge on treatment with alkali in the presence of alcohol. The solution in concentrated sulfuric acid is orange red with a faint brown red fluorescence.

*Example 3*

A mixture of 100 parts of Bzl-chlorbenzanthrone, 300 parts of ground caustic potash and 400 parts of anhydrous pyridine is treated with 180 parts of acetone, at a temperature of about 20° C. Air is excluded, and the mixture well cooled and stirred. When the stirring has been continued for 3 hours, the reaction mixture having a Bordeaux red to brown red color is further treated in the manner described in Example 2. The reaction product gives a deep carmine solution in alcoholic solutions of alkaline agents.

*Example 4*

A mixture of 100 parts of benzanthrone and 200 parts of ground caustic potash is gradually introduced, while stirring, during 1 hour at an initial temperature of 30° C. into 800 parts of acetone. The initially olive to green blue, afterwards violet blue reaction mixture grows warm and attains a temperature of about 40° C. Stirring is continued for one more hour and the reaction mixture worked up as described in Example 2. The product is identical with that described in Example 1.

*Example 5*

100 parts of acetonitrile are dropped and stirred into a mixture of 100 parts of benzanthrone, 300 parts of powdered caustic potash and 400 parts of anhydrous pyridine, in an atmosphere of nitrogen and at a temperature of about 25° to 30° C., the stirring being continued for about 4 to 5 hours. The color of the mixture changes from brown yellow through greenish yellow to violet with a reddish tinge. The reaction mixture is then diluted with about 1200 parts of ethyl alcohol, and the solution, now yellowish red, is introduced into a mixture of hydrochloric acid, in excess, and ice. The reaction product which is resinous first soon becomes hard. After treatment with acetone, if necessary, to remove resinous impurities, it crystallizes from benzene or glacial acetic acid as compact yellow needles melting at 192° to 194° C. and furnishes with alkalies saline compounds which dissolve to an intensely yellowish red solution in ethyl alcohol. The color of the solution in concentrated sulfuric acid is orange with yellow green fluorescence.

If corresponding amounts of the ethyl ester of cyanacetic acid be employed in place of acetonitrile, under the same conditions, a reaction product is obtained the alkali metal salts of which form deep red solutions when dissolved in ethyl alcohol.

*Example 6*

150 parts of benzyl cyanide are introduced, while stirring, into a mixture of 100 parts of benzanthrone, 300 parts of powdered caustic potash and 500 parts of anhydrous pyridine in an atmosphere of nitrogen and at a temperature of about 10° to 15° C. The stirring is continued at that temperature for about 2 to 3 hours. The initially greenish yellow reaction mixture gradually turns pale green, and later bluish green. The further treatment of the reaction mixture is the same as described in Example 5. The product which, if necessary, is freed from resinous impurities, by trituration with acetone crystallizes from benzene in golden yellow lamellæ melting at 208° to 210° C. Its alkali metal salts give deep violet blue solutions in ethyl alcohol. The color of the solution in concentrated sulfuric acid is orange red.

If the benzyl cyanide be replaced by phenylacetamide, which is preferably allowed to react at a slightly higher temperature and for a longer period, a reaction product is obtained the alkali salts of which give a deep blue solution in ethyl alcohol.

Example 7

100 parts of n-propionitrile are introduced at between 25° and 30° C. into a mixture of 100 parts of benzanthrone, 300 parts of pulverized caustic potash and 400 parts of anhydrous pyridine, while stirring and allowing air to have access, and stirring is continued for about 4 hours. The coloration of the mixture changes from brown yellow to orange and carmine red. The reaction mixture is worked up as described in Example 5. The product, when recrystallized from glacial acetic acid, forms brown yellow spear-shaped needles of a melting point between 150° and 152° C. dissolving to a brown yellow solution with a yellow green fluorescence in concentrated sulfuric acid. Its alkali metal salts give deep orange red solutions in ethyl alcohol.

If n-butyronitrile be employed in the same manner instead of n-propionitrile a reaction product is obtained crystallizing in long yellow needles melting at about 139° C., dissolving to a pale yellow solution with a yellow green fluorescence in concentrated sulfuric acid, and the alkali metal salts of which likewise dissolve to deep orange red solutions in ethyl alcohol.

What we claim is:—

1. A process for the production of condensation products of the benzanthrone series which comprises treating a mixture of a benzanthrone with free 2-position and a compound of the general formula X—CH$_2$—R, in which X stands for a carbon atom having attached thereto another atom by means of a double bond, and R stands for hydrogen or a hydrocarbon radicle which may be substituted, with an alkaline condensing agent.

2. A process for the production of condensation products of the benzanthrone series which comprises treating a mixture of a benzanthrone with free 2-position and a compound of the general formula X—CH$_2$—R, in which X stands for a carbon atom having attached thereto another atom by means of a double bond, and R stands for hydrogen or a hydrocarbon radicle which may be substituted, with an alkaline condensing agent in an organic diluent.

3. A process for the production of condensation products of the benzanthrone series which comprises treating a mixture of a benzanthrone with free 2-position and an excess of a compound of the general formula X—CH$_2$—R, in which X stands for a carbon atom having attached thereto another atom by means of a double bond, and R stands for hydrogen or a hydrocarbon radicle which may be substituted, with an alkaline condensing agent.

4. A process for the production of condensation products of the benzanthrone series which comprises treating a mixture of a benzanthrone with free 2-position and a ketone of the general formula R'—CO—CH$_2$—R, in which R stands for hydrogen or a hydrocarbon radicle which may be substituted, and R' stands for an alkyl-, cycloalkyl-, aralkyl-, or aryl- group which may be substituted, with an alkaline condensing agent.

5. A process for the production of condensation products of the benzanthrone series which comprises treating a mixture of a benzanthrone with free 2-position and a ketone of the general formula R'—CO—CH$_2$—R, in which R stands for hydrogen or a hydrocarbon radicle which may be substituted, and R' stands for an alkyl-, cycloalkyl-, aralkyl-, or aryl- group which may be substituted, with an alkaline condensing agent in an organic diluent.

6. A process for the production of condensation products of the benzanthrone series which comprises treating a mixture of a benzanthrone with free 2-position and an excess of a ketone of the general formula R'—CO—CH$_2$—R, in which R stands for hydrogen or a hydrocarbon radicle which may be substituted, and R' stands for an alkyl-, cycloalkyl-, aralkyl-, or aryl- group which may be substituted, with an alkaline condensing agent.

7. As new articles of manufacture condensation products of the benzanthrone series probably corresponding to the formula:

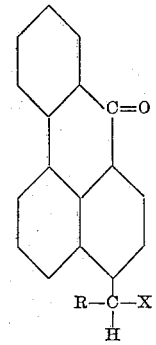

in which X stands for a carbon atom having attached thereto another atom by means of a double bond and R stands for hydrogen or a hydrocarbon radicle which may be substituted, said products being insoluble in dilute acids, forming salt-like compounds with alkali, and furnishing intensely colored solutions in alcohols and acetone.

8. As new articles of manufacture condensation products of the benzanthrone series probably corresponding to the formula:

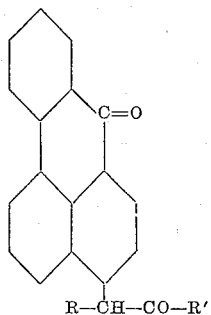

R—CH—CO—R′ in which R stands for hydrogen or a hydrocarbon radicle which may be substituted, and R′ stands for a hydrocarbon radicle which may be substituted, said products being insoluble in dilute acids, forming salt-like compounds with alkali, and furnishing intensely colored solutions in alcohols and acetone.

9. As a new article of manufacture the condensation product of benzanthrone and acetone probably corresponding to the formula:

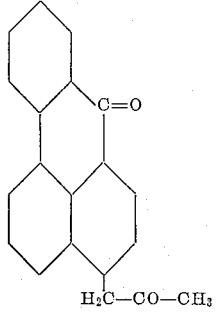

$H_2C$—CO—$CH_3$ crystallizing in compact golden yellow crystals, dissolving to an intensely blue solution with reddish tinge in an alcoholic solution of an alkali metal hydroxid, and to an orange solution with yellow brown fluorescence in concentrated sulfuric acid.

10. A process for the production of condensation products of the benzanthrone series which comprises treating a mixture of a benzanthrone with free 2-position and a compound of the general formula X—$CH_2$—R in which R stands for hydrogen or a hydrocarbon radicle which may be substituted and X stands for the nitrile group, NC—, the acid amide group, $NH_2$—CO, or the acyl group, R′—CO, in the latter group R′ standing for a hydrocarbon radicle which may be substituted, with an alkaline condensing agent.

In testimony whereof we have hereunto set our hands.

ARTHUR LUETTRINGHAUS.
HEINRICH NERESHEIMER.
HANS JOSEF EMMER.